Oct. 30, 1962
G. W. BOWEN
3,061,375
UNLOADING SHOPPING CART
Filed April 1, 1960
2 Sheets-Sheet 1
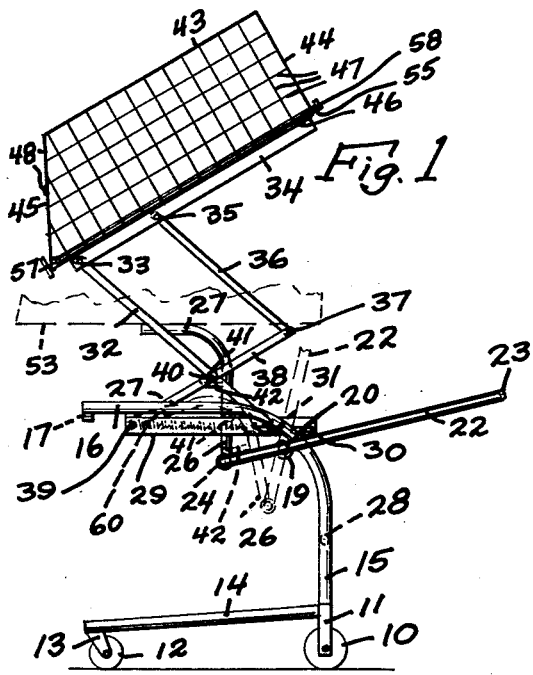
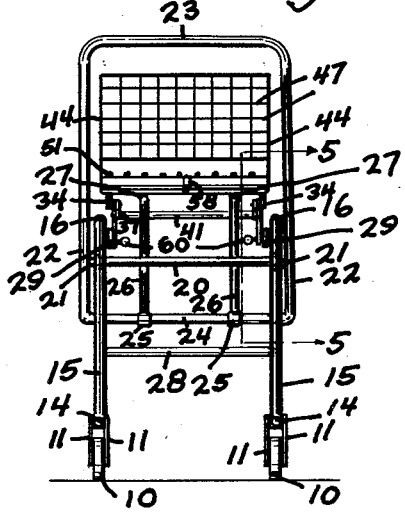
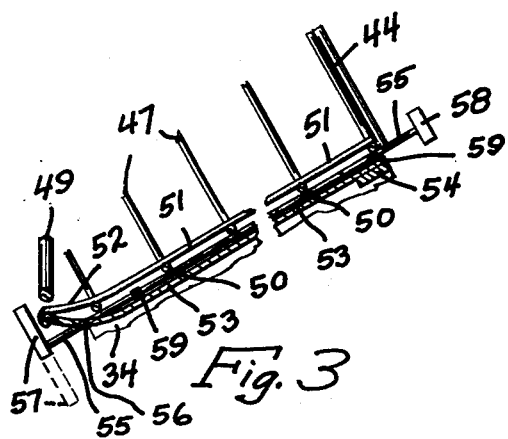
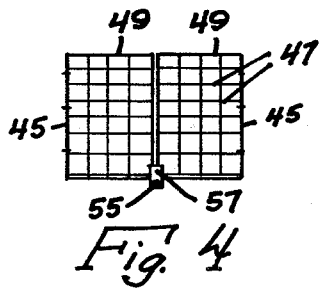
INVENTOR.
Gilbert W. Bowen
BY
Sam J. Slotsky
ATTORNEY Oct. 30, 1962  G. W. BOWEN  3,061,375
UNLOADING SHOPPING CART Filed April 1, 1960  2 Sheets-Sheet 2

INVENTOR.
Gilbert W. Bowen
BY
Sam J. Slotsky
ATTORNEY

United States Patent Office 3,061,375
Patented Oct. 30, 1962

3,061,375
UNLOADING SHOPPING CART
Gilbert W. Bowen, Aurelia, Iowa
Filed Apr. 1, 1960, Ser. No. 19,417
5 Claims. (Cl. 298—2)

My invention relates to an unloading shopping cart.

An object of my invention is to provide a shopping cart which can be conveniently manipulated by the user of the cart so that the basket in which the groceries are contained will be elevated, and also angularly positioned, so that the groceries in the cart will readily gravitate downwardly onto a store counter thereby providing means whereby it will not be necessary to lift out each grocery item at a time, this arrangement thereby resulting in a great deal faster handling of grocery items in that the items are checked out much more quickly.

A further object of my invention is to provide an arrangement which provides the raising and tilting action in an efficient mechanism, and in which the basket can be conveniently lowered to its shopping position.

Figure 5:
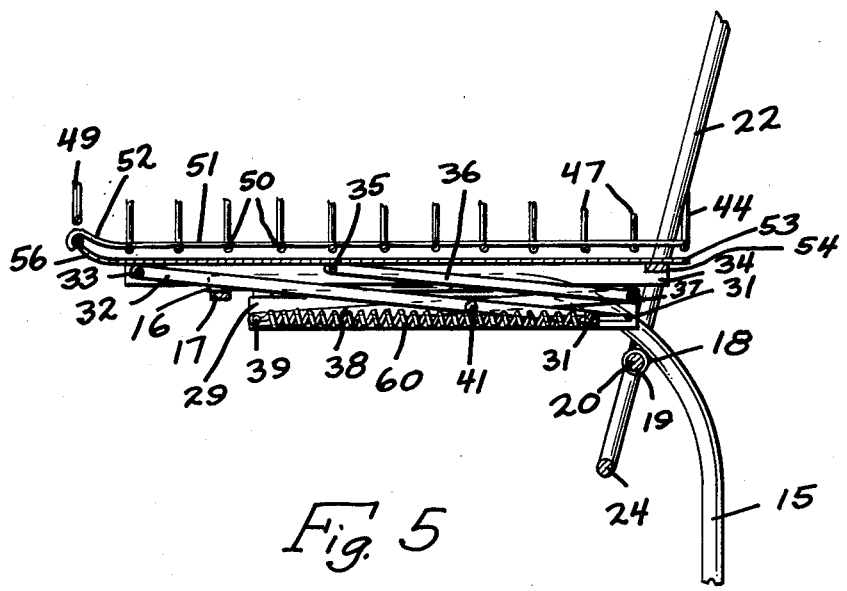
Figure 6:
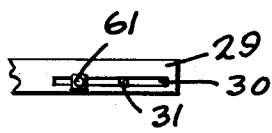

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation showing the basket portion in its elevated position, FIGURE 2 is a rear view of FIGURE 1, FIGURE 3 is an enlarged sectional detail, FIGURE 4 is a forward view of the shopping basket in its horizontal position, FIGURE 5 is an enlarged sectional view taken along the lines 5—5 of FIGURE 2, and FIGURE 6 is a detail.

My invention contemplates the provision of a grocery shopping unit which is portable in that it can be wheeled about, and in which the shopper can place all of the grocery items therein, and wherein the shopper when arriving at the check-out counter can conveniently raise the arrangement and at the same time tilt it, so that the groceries will slide down onto the counter and whereby the clerk can then check out the items rapidly.

I have used the character 10 to designate a pair of rear wheels journalled in the supports 11, the character 12 indicating forward wheels journalled to the swivelling casters 13, the character 14 indicating a pair of spaced framework members.

The character 15 indicates a pair of tubular members extending vertically, and thence extending into the horizontal portions 16, and attached across the forward ends of the horizontal portions 16 is a strap 17. Attached to the members 15 at 18 (see FIGURE 5) are a pair of collars 19 in which collars is journalled a transverse bar 20, which bar 20 is secured at 21 to the side members 22 of the handle unit, this unit including the transverse bar portion 23 which is grasped when the cart is manipulated, and also attached across the lower ends of the members 22 is a further tubular bar 24.

Receiving the bar 24 are the collars 25 which collars are attached to the further tubular members 26 which extend into the abutment portions 27 substantially at right angles thereto.

The character 28 indicates a transverse brace attached to the members 15. Suitably attached to the portions 16 are the horizontally positioned lengthened plates 29 which include the rear slots 30, and received within the slots 30 are the pins 31. Pivoted to the pins 31 are the substantially long bars 32 which in turn are pivoted at 33 to the straps 34.

Also pivoted to the straps 34 at 35 are further lengthened bars 36 which are pivoted at 37 to further bars 38 which are pivoted at 39 to the plates 29. The bars 32 and 38 are mutually pivoted together at 40, and extending from this mutual pivoting point is a transverse bar 41. Attached to the members 26 are the short stop members 42.

The basket portion of the device comprises the side framework portions 43, 44, 45, and 46, and attached across these portions are the wire members 47 which are also provided at the rear of the basket portion, and hinged at 48 to the bars 45 are the forward gate portions 49 which are slightly separated at the center (see FIGURE 4).

The wires 47 extend into the transverse base wire portions 50 (see FIGURE 3), and extending transversely to these portions and longitudinally of the basket are the circular heavy wire members 51 which extend into the curved portions at 52, the character 53 (see FIGURE 3) indicating a sheet metal base member which is secured to a transverse strap 54, which strap 54 is attached between the bars 34.

A control rod 55 passes between the transverse bar portions 50 and the sheet metal member 53 and passes through the curved portion 56 of the sheet metal member 53, and is secured to a latch bar 57, which latch bar is controlled by means of the handle 58, the bar 55 being suitably journalled at 59.

Attached to the pivoting points 31 are the helical springs 60 which are attached to the points 39.

The device is operated in the following manner.

During normal use, and when the articles are being gathered in the store, the arrangement is pushed by means of the handle portion 23, the wheels providing a portable unit. The grocery items are placed in the basket, the basket is then pushed to the discharging counter, and as soon as the customer reaches the counter, he or she pushes downwardly on the handle 23 whereby the side portions 22 are swung downwardly toward the position shown in FIGURE 1.

During this action the pins 31 will ride in the slots 30 toward the left as viewed in FIGURE 5, and the bars 32 and 36 as well as the bars 38 will be pivoted, this action being assisted by the pulling effort of the springs 60, and these bars will rise to the position shown in FIGURE 1, with the transverse bar 41 also rising.

During the first part of the raising action, the portions 27 of the bars 26 will abut against the sheet metal member 53 and will start the raising action to the basket. During this raising action, the stop members 42 will abut against the transverse bar 41, whereupon the bar 41 will continue to rise, which correspondingly continues the upward motion of the basket.

Since the lower ends of the bars 32 at the pins 31 are moving toward the left as viewed in FIGURES 1 and 5, and since the pivoting points of the bars 38 at 39 are stationary, the effect will be for the pivoting points 33 to travel more rapidly toward the right, and as the pivoting points 35 rise, the tendency will be for the bars 36 to cause a tipping action at the points 35 with respect to the points 33, so that as a result as the basket rises, it will tip to a greater angle correspondingly. At its maximum height, the handle 58 can be rotated which will cause the latch member 57 to rotate to the dotted position shown in FIGURE 3, which will correspondingly allow the gates 49 to swing open by gravity, etc., and also due to the weight of the groceries thereagainst.

It will be noted that the longitudinally positioned heavy wires 51 permit a smooth sliding action to the groceries with a minimum of friction, so that the groceries will gravitate downwardly much more rapidly, the curved portions 52 causing the groceries to ride off gently onto the counter.

After discharging the contents of the basket, the basket can be pushed downwardly which will collapse the arrangement to its horizontal position ready for the next operation.

FIGURE 6 discloses an arrangement wherein a nut and bolt arrangement 61 can be locked within the slot 30 to limit the movement of the pin 31, and in this manner the limit to the height of the raising of the basket is effected for higher or lower counters and the like.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. An unloading shopping cart comprising a basket, a mobile framework supporting said basket, a handle member pivotally attached to said framework, said handle member including a lower portion, said lower portion including a pair of abutment portions journalled thereon, said abutment portions being adapted to bear against the base of said basket to raise the same, means for additionally raising said basket including a pair of bars pivotally attached at the forward ends of said basket, a pair of longitudinally positioned plates attached to said framework having rearwardly positioned horizontal slots therein, said bars including pins at their lower ends engaged in said slots, further bars pivotally attached to said bars, the lower ends of said further bars being pivotally attached to the forward ends of said plates, still further bars pivotally attached to the upper ends of said further bars, said still further bars being pivotally attached to said basket at a spaced distance from the pivotal attachment of said bars and said basket, a transverse bar attached to the pivotal points of said bars and said further bars, said abutment portions including stop members attached thereto for engaging said transverse bar.

2. An unloading shopping cart comprising a basket, a mobile framework supporting said basket, a handle member pivotally attached to said framework, said handle member including a lower portion, said lower portion including a pair of abutment portions journalled thereon, said abutment portions being adapted to bear against the base of said basket to raise the same, means for additionally raising said basket including a pair of bars pivotally attached at the forward ends of said basket, a pair of longitudinally positioned plates attached to said framework having rearwardly positioned horizontal slots therein, said bars including pins at their lower ends engaged in said slots, further bars pivotally attached to said bars, the lower ends of said further bars being pivotally attached to the forward ends of said plates, still further bars pivotally attached to the upper ends of said further bars, said still further bars being pivotally attached to said basket at a spaced distance from the pivotal attachment of said bars and said basket, a transverse bar attached to the pivotal points of said bars and said further bars, said abutment portions including stop members attached thereto for engaging said transverse bar, slidable movement of said pins in said slots providing means whereby the pivotal attachment of said still further bars with said basket will cause said basket to tip forward a vertical position during upward movement of said basket, helical springs attached between said pins and the pivoting points of said further bars.

3. An unloading shopping cart comprising a basket, a mobile framework supporting said basket, a handle member pivotally attached to said framework, said handle member including a lower portion, said lower portion including a pair of abutment portions journalled thereon, said abutment portions being adapted to bear against the base of said basket to raise the same, means for additionally raising said basket including a pair of bars pivotally attached at the forward ends of said basket, a pair of longitudinally positioned plates attached to said framework having rearwardly positioned horizontal slots therein, said bars including pins at their lower ends engaged in said slots, further bars pivotally attached to said bars, the lower ends of said further bars being pivotally attached to the forward ends of said plates, still further bars pivotally attached to the upper ends of said further bars, said still further bars being pivotally attached to said basket at a spaced distance from the pivotal attachment of said bars and said basket, a transverse bar attached to the pivotal points of said bars and said further bars, said abutment portions including stop members attached thereto for engaging said transverse bar, slidable movement of said pins in said slots providing means whereby the pivotal attachment of said still further bars with said basket will cause said basket to tip toward a vertical position during upward movement of said basket, helical springs attached between said pins and the pivoting points of said further bars, said basket including longitudinally positioned circular-in-section wires at the base thereof to provide greater sliding action to groceries in said basket.

4. An unloading shopping cart comprising a basket, a mobile framework supporting said basket, a handle member pivotally attached to said framework, said handle member including a lower portion, said lower portion including a pair of abutment portions journalled thereon, said abutment portions being adapted to bear against the base of said basket to raise the same, means for additionally raising said basket including a pair of bars pivotally attached at the forward ends of said basket, a pair of longitudinally positioned plates attached to said framework having rearwardly positioned horizontal slots therein, said bars including pins at their lower ends engaged in said slots, further bars pivotally attached to said bars, the lower ends of said further bars being pivotally attached to the forward ends of said plates, still further bars pivotally attached to the upper ends of said further bars, said still further bars being pivotally attached to said basket at a spaced distance from the pivotal attachment of said bars and said basket, a transverse bar attached to the pivotal points of said bars and said further bars, said abutment portions including stop members attached thereto for engaging said transverse bar, slidable movement of said pins in said slots providing means whereby the pivotal attachment of said still further bars with said basket will cause said basket to tip toward a vertical position during upward movement of said basket, helical springs attached between said pins and the pivoting points of said further bars, said basket including longitudinally positioned circular-in-section wires at the base thereof to provide greater sliding action to groceries in said basket, said basket including a pair of forward gates hinged to the sides of said basket, means for providing opening of said gates.

5. An unloading shopping cart comprising a basket, a mobile framework supporting said basket, a handle member pivotally attached to said framework, said handle member including a lower portion, said lower portion including a pair of abutment portions journalled thereon, said abutment portions being adapted to bear against the base of said basket to raise the same, means for additionally raising said basket including a pair of bars pivotally attached at the forward ends of said basket, a pair of longitudinally positioned plates attached to said framework having rearwardly positioned horizontal slots therein, said bars including pins at their lower ends engaged in said slots, further bars pivotally attached to said bars, the lower ends of said further bars being pivotally attached to the forward ends of said plates, still further bars pivotally attached to the upper ends of said further bars, said still further bars being pivotally attached to said basket at a spaced distance from the pivotal attachment of said bars and said basket, a transverse bar attached to the pivotal points of said bars and said further bars, said abutment portions including stop members attached thereto for engaging said transverse bar, slidable movement of said pins in said slots providing means whereby the pivotal attachment of said still further bars with said basket will cause said basket to tip toward a vertical position during upward movement of said basket, helical springs attached between said pins and the pivoting points of said further bars, said basket including longitudinally positioned circular-in-section wires at the base thereof to provide greater sliding action to groceries in said basket, said basket including a pair of forward gates hinged to the sides of said basket, means for providing opening of said gates, means for limiting movement of said pins in said slots including limiting members secured in said slots.

References Cited in the file of this patent

UNITED STATES PATENTS

| | | |
|---|---|---|
| 1,412,681 | Gasser | Apr. 11, 1922 |
| 2,709,109 | Reyburn | May 24, 1955 |